United States Patent [19]

Grotta et al.

[11] 4,436,625

[45] Mar. 13, 1984

[54] METHOD FOR PURIFICATION OF CRESIDINE SULFONIC ACID BY SOLVENT EXTRACTION

[75] Inventors: Henry M. Grotta, Delaware; Perry J. Gaughan, Columbus, both of Ohio

[73] Assignee: Buffalo Color Corp., West Paterson, N.J.

[21] Appl. No.: 319,607

[22] Filed: Nov. 9, 1981

[51] Int. Cl.$^3$ ............................................. B01D 11/04
[52] U.S. Cl. .................................................. 210/634
[58] Field of Search ......................... 210/634; 426/540

[56] References Cited

PUBLICATIONS

Dictionary of Organic Compounds, vol. 1, 1965, p. 109.
Hamilton et al., Industrial Toxicology, 1949, pp. 450–454.
Wilson et al., Textbook of Pharmaceutical Chemistry, 1954, p. 483.

*Primary Examiner*—Frank A. Spear, Jr.
*Attorney, Agent, or Firm*—Michael L. Dunn; Howard M. Ellis; William J. Crossetta

[57] ABSTRACT

A method for removing residual cresidine from impure p-cresidine sulfonic acid which impure p-cresidine sulfonic acid contains from above about two parts per billion to about 1500 parts per million of cresidine. The method comprises contacting an aqueous solution of the impure p-cresidine sulfonic acid with sufficient liquid hydrocarbon of from five to eighteen carbon atoms for a sufficient time to extract the cresidine from the p-cresidine sulfonic acid to a concentration of less than two parts per billion of cresidine in the p-cresidine sulfonic acid.

16 Claims, No Drawings

METHOD FOR PURIFICATION OF CRESIDINE SULFONIC ACID BY SOLVENT EXTRACTION

BACKGROUND OF THE INVENTION (A) Field of the Invention

This invention relates to the preparation of purified cresidine sulfonic acid suitable for use as an intermediate in food grade materials. More particularly, this invention relates to the removal of residual cresidine from impure cresidine sulfonic acid.

(B) History of the Prior Art

Cresidine sulfonic acid is usually prepared by sulfonation of p-cresidine to form the p-cresidine sulfate salt which rearranges to form p-cresidine sulfonic acid. p-Cresidine, also known as 2-methoxy-5-methylaniline or 5-methyl o-anisidine, is a compound known in the art which is manufactured by known procedures. One such procedure, for example, is by the reduction of 4-methyl-2-nitroanisole.

Cresidine sulfonic acid prepared by sulfonation of p-cresidine usually contains some residual cresidine. Such cresidine can be removed by established procedures to as low as a few parts per million or lower. Cresidine, however, is completely undesirable in p-cresidine sulfonic acid when the p-cresidine sulfonic acid is to be used in the manufacture of ingestible substances such as food dyes. p-Cresidine sulfonic acid is, for example, used as an intermediate in the manufacture of FDC Red No. 40.

While it has not been established that very low levels of cresidine such as one part per million cause any substantial health hazard, it is desirable to remove as much cresidine as possible from p-cresidine sulfonic acid which is used as an intermediate in the manufacture of ingestible substances since cresidine might be a potential carcinogen at higher concentrations.

In the prior art, it was not possible to remove cresidine to below detectable limits, i.e., about two parts per billion or lower.

BRIEF DESCRIPTION OF THE INVENTION

In accordance with the present invention, there is provided a method for removing residual cresidine from impure p-cresidine sulfonic acid which contains from above 2 parts per billion to about 1,500 parts per million of cresidine. The method of the invention comprises contacting an aqueous solution of the impure cresidine sulfonic acid with sufficient liquid hydrocarbon of from 5 to 18 carbon atoms for a sufficient time to extract the cresidine from the p-cresidine sulfonic acid to a concentration of less than two parts per billion of cresidine.

DETAILED DESCRIPTION OF THE INVENTION

The impure p-cresidine sulfonic acid, treated in accordance with the present invention, contains from above 2 parts per billion to about 1,500 parts per million of cresidine. An aqueous solution of the impure p-cresidine sulfonic acid is contacted with a sufficient liquid hydrocarbon by any suitable means such as agitation of the liquid hydrocarbon with the p-cresidine sulfonic acid solution or contact in a counter current column. The impure cresidine sulfonic acid, as previously mentioned, contains from above 2 parts per billion to about 1,500 parts per million of cresidine but usually contains from above about 5 parts per billion to about 100 parts per million of cresidine.

Essentially any liquid hydrocarbon of from 5 to 18 carbon atoms may be used to extract the cresidine. The liquid hydrocarbon may be aliphatic or aromatic; however, due to a somewhat higher hydrophobic character of aliphatic hydrocarbons, aliphatic hydrocarbons are generally preferred. A particularly desirable aliphatic hydrocarbon is hexane.

A sufficient time for contacting the aliphatic hydrocarbon with the cresidine sulfonic acid solution is from about 30 seconds to about 48 hours and usually from about 10 minutes to 24 hours. The contact time is dependent upon the quantity of cresidine contained in the cresidine sulfonic acid, the strength of the cresidine sulfonic acid aqueous solution, the nature of the hydrocarbon, the ratio of the hydrocarbon to the p-cresidine sulfonic acid aqueous solution and the efficiency of the contact of the hydrocarbon with the solution.

The sufficient hydrocarbon is usually a volume ratio of hydrocarbon to impure p-cresidine sulfonic acid aqueous solution for from about 0.2:1 to 5:1 and most often a ratio of from about 0.5:1 to 3:1. The ratio required is dependent upon similar conditions governing the sufficiency of contact time, i.e., the concentration of p-cresidine sulfonic acid in the aqueous solution, the concentration of cresidine, the nature of the hydrocarbon, contact time and the efficiency of contact of the hydrocarbon with the solution.

If desired, the cresidine sulfonic acid may be pre-purified to increase the efficiency of the extraction method. Prepurification methods may include contact of the cresidine sulfonic acid with sulfuric acid and steam distillation.

The hydrocarbon, in accordance with the present invention, may be recovered from extracted cresidine by distillation.

The following examples serve to illustrate and not limit the present invention. Unless otherwise indicated, all parts and percentages are by weight.

EXAMPLE 1

750 milliliters of p-cresidine sulfonic acid solution containing about 24 weight percent of cresidine sulfonic acid was adjusted to pH 10 with 50% sodium hydroxide and added to a continuous extraction apparatus with solvent reboiler. The extraction was carried out for approximately 10 hours with about 500 milliliters of hexane. Within the first hour, the hexane had acquired a yellowish color which became more intense throughout the 10 hour period. After completion, the hexane was evaporated to a few milliliters and diluted back to 100 milliliters with hexane. UV adsorbtion indicated the presence of 835.5 parts per million of cresidine (based upon cresidine sulfonic acid) in the hexane. Two samples from the aqueous phase were also analyzed for cresidine and found to contain 214.1 parts per million and 242.1 parts per million respectively. This example indicates that after a 10 hour continuous extraction of cresidine sulfonic acid with hexane, approximately 78.5% of the cresidine was removed from the cresidine sulfonic acid solution.

EXAMPLE 2

A second 750 milliliter sample of p-cresidine sulfonic acid solution containing slightly over 1000 parts per million of cresidine was extracted in a manner similar to Example 1. for 18.5 hours with approximately 500 milliliters of hexane. The initial 500 milliliters of hexane was evaported to approximately 20 milliliters and diluted to 100 milliliters with fresh hexane. UV adsorbtion indicated that the solvent contained 1068 parts per million of cresidine based upon p-cresidine sulfonic acid. The extraction was then continued with 500 milliliters of fresh hexane for another 29.5 hours. UV adsorbtion indicated the presence of 68.2 parts per million of cresidine in the solvent. A third portion of 500 milliliters of hexane was run for 28 additional hours and upon analysis of the p-cresidine sulfonic acid, no detectable cresidine was found.

What is claimed is:

1. A method for removing residual cresidine from impure p-cresidine sulfonic acid which impure p-cresidine sulfonic acid contains from above about 2 parts per billion to about 1500 parts per million of cresidine, said method comprising contacting an aqueous solution of the impure p-cresidine sulfonic acid with sufficient liquid hydrocarbon of from five to eighteen carbon atoms for a sufficient time to extract the cresidine from the p-cresidine sulfonic acid to a concentration of less than two parts per billion of cresidine in the p-cresidine sulfonic acid.

2. The method of claim 1 wherein the liquid hydrocarbon is an aliphatic hydrocarbon.

3. The method of claim 2 wherein the liquid hydrocarbon is hexane.

4. The method of claim 3 wherein the impure cresidine sulfonic acid contains from above about 5 parts per billion to about 100 parts per million of cresidine.

5. The method of claim 3 wherein the sufficient time is from 10 minutes to 24 hours.

6. The method of claim 3 wherein the sufficient hydrocarbon is a volume ratio of hydrocarbon to impure cresidine sulfonic acid aqueous solution of from about 0.2:1 to 5:1.

7. The method of claim 1 wherein the impure cresidine sulfonic acid contains from above about 5 parts per billion to about 100 parts per million of cresidine.

8. The method of claim 1 wherein the impure cresidine sulfonic acid is contacted with the hydrocarbon by agitation.

9. The method of claim 8 wherein the sufficient time is from 10 minutes to 24 hours.

10. The method of claim 1 wherein the impure cresidine sulfonic acid is contacted with the hydrocarbon in a countercurrent column.

11. The method of claim 7 wherein the sufficient time is from 10 minutes to 24 hours.

12. The method of claim 1 wherein the sufficient time is from 10 minutes to 24 hours.

13. The method of claim 12 wherein the sufficient hydrocarbon is a volume ratio of hydrocarbon to impure cresidine sulfonic acid aqueous solution of from about 0.2:1 to 5:1.

14. The method of claim 1 wherein the sufficient hydrocarbon is a volume ratio of hydrocarbon to impure cresidine sulfonic acid aqueous solution of from about 0.2:1 to 5:1.

15. The method of claim 1 wherein cresidine is steam distilled from the impure cresidine sulfonic acid prior to contact with the hydrocarbon.

16. The method of claim 1 wherein multiple extractions with said liquid hydrocarbon are used to reduce the concentration of cresidine in the p-cresidine sulfonic acid to below two parts per billion.

* * * * *